United States Patent
Libeskind et al.

(10) Patent No.: US 8,873,947 B2
(45) Date of Patent: Oct. 28, 2014

(54) METHOD AND APPARATUS FOR DETERMINING FIBER CHARACTERISTICS IN AN OPTICAL COMMUNICATION NETWORK

(75) Inventors: Michael B. Libeskind, Yardley, PA (US); Dat D. Ngo, Howell, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1361 days.

(21) Appl. No.: 11/850,454

(22) Filed: Sep. 5, 2007

(65) Prior Publication Data
US 2009/0060498 A1 Mar. 5, 2009

(51) Int. Cl.
*H04B 10/00* (2013.01)
*H04B 10/077* (2013.01)

(52) U.S. Cl.
CPC .................................. *H04B 10/0775* (2013.01)
USPC .................................. 398/13; 398/20; 398/18

(58) Field of Classification Search
USPC ...................................................... 398/16, 31
See application file for complete search history.

(56) References Cited

U.S. PATENT DOCUMENTS

| | | | |
|---|---|---|---|
| 5,296,957 A * | 3/1994 | Takahashi et al. ............ | 398/177 |
| 5,299,044 A * | 3/1994 | Mosch et al. .................... | 398/35 |
| 5,452,115 A * | 9/1995 | Tomioka ......................... | 398/75 |
| 5,784,558 A * | 7/1998 | Emerson et al. ............... | 709/230 |
| 6,751,198 B1 * | 6/2004 | McPherson et al. ........... | 370/252 |
| 6,765,659 B1 * | 7/2004 | Bhatnagar et al. ............ | 356/73.1 |
| 7,020,397 B2 * | 3/2006 | Lemoff et al. ................. | 398/154 |
| 7,146,085 B2 * | 12/2006 | Tadakuma et al. ............ | 385/122 |
| 7,174,108 B2 * | 2/2007 | Kamura ......................... | 398/181 |
| 7,187,860 B2 * | 3/2007 | Bergano et al. .................... | 398/9 |
| 7,260,324 B2 * | 8/2007 | Passier et al. .................... | 398/17 |
| 7,289,729 B1 * | 10/2007 | Eslambolchi et al. .......... | 398/28 |
| 7,295,776 B2 * | 11/2007 | Okubo et al. ................... | 398/58 |
| 7,315,694 B2 * | 1/2008 | Shin et al. ....................... | 398/57 |
| 7,369,763 B2 * | 5/2008 | Parsons ........................... | 398/16 |
| 7,469,101 B1 * | 12/2008 | Eslambolchi et al. .......... | 398/28 |
| 7,489,638 B2 * | 2/2009 | Keslassy et al. .............. | 370/238 |
| 7,505,683 B1 * | 3/2009 | Lemieux et al. .................. | 398/4 |
| 7,512,343 B2 * | 3/2009 | Sridhar et al. ................ | 398/147 |
| 7,551,857 B2 * | 6/2009 | Fukushi et al. ............... | 398/177 |
| 7,630,639 B2 * | 12/2009 | Kramer et al. ................. | 398/72 |
| 7,650,073 B2 * | 1/2010 | Burnett et al. ................. | 398/31 |
| 7,660,524 B2 * | 2/2010 | Kallstenius ...................... | 398/4 |
| 2002/0024690 A1 * | 2/2002 | Iwaki et al. .................... | 359/110 |
| 2002/0024694 A1 * | 2/2002 | Newell et al. ................. | 359/124 |
| 2005/0047711 A1 * | 3/2005 | Ide et al. .......................... | 385/18 |
| 2007/0127919 A1 * | 6/2007 | Kallstenius ..................... | 398/25 |
| 2007/0140696 A1 * | 6/2007 | DeCusatis et al. .............. | 398/98 |
| 2007/0258721 A1 * | 11/2007 | Boduch et al. ................ | 398/147 |
| 2009/0060498 A1 * | 3/2009 | Libeskind et al. .............. | 398/28 |

OTHER PUBLICATIONS

"Contemporaneously", Oxford English Dictionary Online, Oxford University Press, 2010.*
O. Gurewitz and M. Sidi "Estimating One-Way Delays From Cyclic-Path Delay Measurements," IEEE Infocom 2001, pp. 1038-1044.

* cited by examiner

*Primary Examiner* — Danny Leung
(74) *Attorney, Agent, or Firm* — Wall & Tong, LLP

(57) ABSTRACT

An apparatus and method for deriving fiber characteristics between two nodes in an optical communication network are disclosed. A roundtrip time for a signal to travel between two nodes is measured by sending the signal via the optical supervisory channel from a first node to a second node, which is configured for loopback operation. Fiber characteristics can be calculated based on the measured roundtrip time.

20 Claims, 5 Drawing Sheets

US 8,873,947 B2

METHOD AND APPARATUS FOR DETERMINING FIBER CHARACTERISTICS IN AN OPTICAL COMMUNICATION NETWORK

FIELD OF THE INVENTION

The present invention generally relates to a method and apparatus for determining fiber characteristics in an optical communication network.

BACKGROUND OF THE INVENTION

Characteristics of transmission fibers, e.g., fiber loss and dispersion, may change over time, and there is often a need for operators of optical communication network, e.g., wavelength division multiplexing (WDM) systems, to obtain updated information on span length, span loss and fiber dispersion between communication nodes or network elements (NE) in deployed systems.

Optical time domain reflectometry (OTDR) is typically used for determining fiber characteristics during initial calibration of a transmission fiber. Using the OTDR device, fiber characteristics can be derived by sending a pulse of light down the fiber and measuring its back reflection. Based on the optical power received, the length of time to receive the reflected signal, and the phase shift of the signal, an approximation of the fiber length, residual chromatic dispersion, and fiber loss can be obtained. One drawback in such a technique is that, once the fiber is connected to a WDM system and deployed in the field, OTDR measurements cannot be performed without interfering with live traffic, including for example, disconnecting the transmission fiber from the WDM system.

Alternative methods for fiber characterization in WDM systems are thus needed.

SUMMARY OF INVENTION

One embodiment of the present invention provides a method for deriving at least one fiber characteristic between a first node and a second node in an optical communication network, the method includes: (a) measuring a roundtrip time for a signal on an optical supervisory channel to travel between the first node and the second node, and (b) calculating the at least one fiber characteristic based on the roundtrip time.

Another embodiment provides a system for determining at least one fiber characteristic associated with a span connecting two nodes in an optical communication network, including: a first node configured for transmitting a first signal on an optical supervisory channel to a second node, the second node configured for transmitting a copy of the first signal to the first node in response to receiving the first signal, the first node further configured for measuring a roundtrip time for the first signal to travel between the first node and the second node, and calculating the at least one fiber characteristic based on the measured roundtrip time.

Yet another embodiment provides a system for determining at least one fiber characteristic associated with a span connecting two nodes in an optical communication network, the system includes a first node configured for measuring a roundtrip time for a signal on an optical supervisory channel to travel between the first node and a second node, and for calculating the at least one fiber characteristic based on the measured roundtrip time.

Yet another embodiment provides a computer readable medium containing instructions, which when executed, cause an apparatus to perform a method, the method includes: (a) measuring a roundtrip time for a signal on an optical supervisory channel to travel between a first node and a second node of an optical communication network, and (b) calculating at least one fiber characteristic based on the roundtrip time.

BRIEF DESCRIPTIONS OF THE FIGURES

The teachings of the present invention can be readily understood by considering the following detailed description in conjunction with the accompanying drawings, in which:

FIG. 1A is a schematic illustration of two nodes in an optical communication network;

FIGS. 1B-D are schematic illustrations of signal transmissions for determining fiber characteristics according to one embodiment of the present invention;

FIG. 2A-B are schematic illustrations of embodiments of an apparatus suitable for implementing a method of the present invention;

To facilitate understanding, identical reference numerals have been used, where possible, to designate identical elements that are common to the figures.

DETAILED DESCRIPTION

Embodiments of the present invention provide a method and apparatus for deriving fiber characteristics between two nodes in a WDM system via signaling in an optical supervisory channel (OSC). This method avoids the need for external measuring device and allows determination of fiber characteristics with minimal to no traffic interruption.

In one embodiment, a span length between two nodes is derived by sending a special signal from one node to another, and determining the flight time of the special signal between the two nodes. Specifically, one node is put into a loopback mode for sending the received signal, or a copy of the signal, back to the originating node. Other fiber characteristics such as span loss and dispersion between the two nodes can also be derived based on the measured flight time.

Figure 1A:
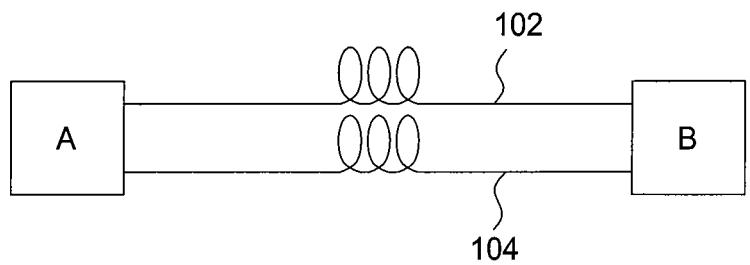

The determination of the span length can be understood by reference to FIGS. 1A-D, in which FIG. 1A is a schematic illustration of two nodes, A and B, connected to each other via fiber links 102 and 104 in an optical communication system 100.

Figure 1B:
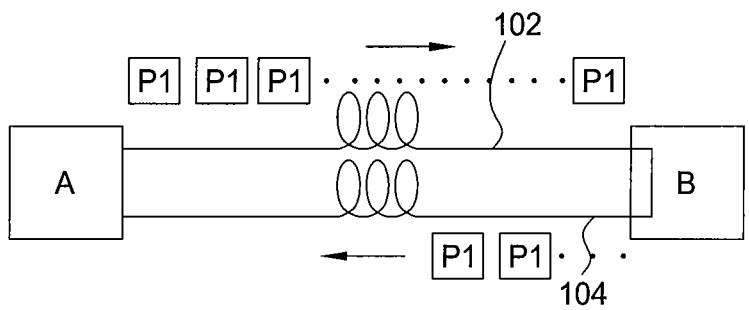

To implement the span length determination, communication needs to be established between node A and node B via signaling in the OSC. In one embodiment, at least one signal packet, P1, having a predetermined pattern that is different from those of other signals normally present in the OSC, is sent from node A to node B via fiber 102, as shown in FIG. 1B. In another embodiment, the loopback mode in node B can be established by sending instructions directly from a craft interface terminal (CIT) to node B. This arrangement is useful, for example, in situations where it may not be feasible or practical to provide packets P1 with a bit pattern that is different from those of other signals in the OSC. This special signal packet P1, which is used for instructing node B to enter a loopback mode, may also be referred to as a loopback instruction. Whether one or more than one packet is sent from node A to node B will depend on the specific status of node B. For example, if node B is already online when the request for span length determination is initiated, then only one packet is sufficient. However, if node B is not online when the request is initiated, then more than one packet will need to be sent.

Upon receiving a packet P1, node B will enter a loopback mode, in which each subsequently received signal or a copy of the signal is sent back to node A via fiber 104. Node B is configured such that there is a minimal time delay between the time of receipt of a signal packet from node A and the time of transmission of the packet (or a copy) back to node A. Node B is configured such that they will stay in the loopback mode for a predetermined time period, after which, it will automatically resume the normal communication in the OSC. As an example, this predetermined time period is about 5 seconds. In general, node B should be in the loopback mode at least for a time duration to allow the following events to take place: propagation of the first P1 packet from node B to node A, time for node A to enter a transmission mode and start transmitting packets P2 (typically a very short time delay, e.g., on the order of a few microseconds), propagation of the first P2 packet from node A to node B, and the propagation of the first P2 packet from node B to node A.

Figure 1C:
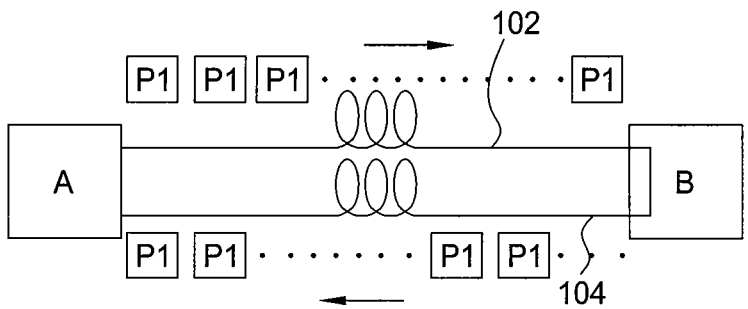

FIG. 1C illustrates that, soon after node A has received the first packet P1 that is sent or looped back from node B, node A starts sending at least one signal packet P2 to node B. In this example, several packets P2 are sent to node B, although it is also possible to send only one packet P2 to node B. Since packet P2 is used for flight time measurements, it may also be referred to as a measurement signal.

Packet P2 has a predetermined pattern that is different from those of P1 and other signals normally present in the OSC. The patterns for packets P1 and P2 are selected so that they can be readily distinguished from each other, and from other signals that may be present in the OSC. For example, P1 may contain a pattern of 01010101, and P2 may contain a pattern of 00110011. The time at which the first signal packet P2 is sent from node A is designated as time "zero" for the purpose of flight time measurements.

Figure 1D:
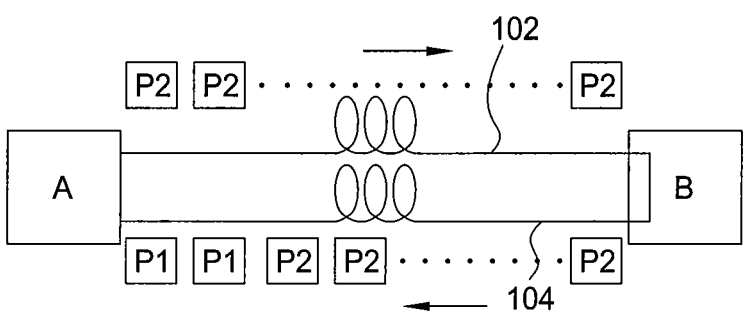

FIG. 1D illustrates packets P2 being looped back from node B to node A. The packets P2 being sent from node B may be the same packets received by node B, or they may be copies of the received packets. The time at which node A receives the first packet P2 from node B, i.e., the roundtrip flight time, is designated as T seconds. In this example, as a first order approximation, it is assumed that the span length between the two nodes A and B is symmetrical, i.e., the fiber length in the downstream span 102 is equal to the fiber length in the upstream 104. The one-way flight time between nodes A and B is then given by T/2 seconds. The span length L can be derived from the one-way flight time by multiplying by the speed of light in the fiber (c), i.e., L=(T/2)c. After the receipt of the P2 packet, node A resumes its normal communication of sending normal frames on the OSC. Any remaining P2 packets sent during the flight time measurement period are ignored and discarded.

Figure 2A:
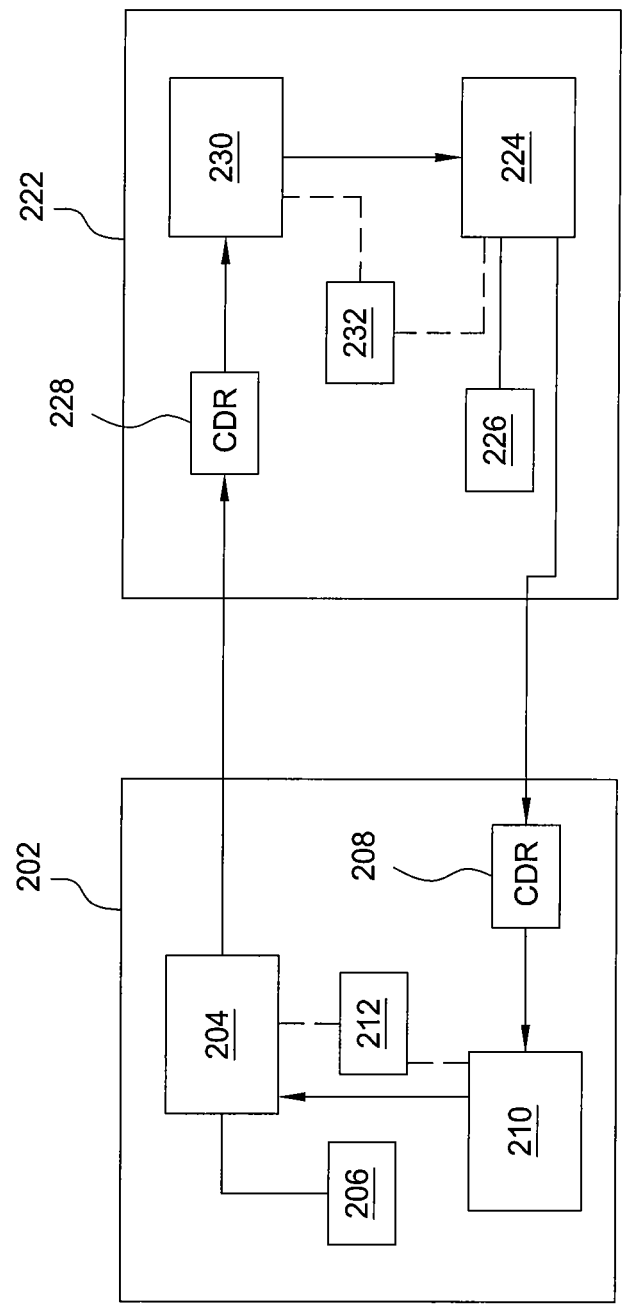

FIG. 2A is a schematic illustration of the hardware at nodes A and B, e.g., respective circuit packs 202 and 212, that can be used for implementing the loopback and detection of packets P1 and P2.

Node A contains a circuit pack 202, which includes a signal generator 204 and a local clock 206 for transmitting signal packets, and a clock/data recovery (CDR) unit 208 and detector 210 for detecting signal packets. Node B has a similar circuit pack 222, which includes a signal generator 224 and a local clock 226 for transmitting signal packets, and a clock/data recovery (CDR) unit 228 and detector 230 for detecting signal packets. In one embodiment, each circuit pack also includes a field programmable gate array (FPGA) 212, 232, or other suitable computer readable medium, containing instructions that, when executed, will perform method steps to measure flight time between two nodes for determining fiber characteristics.

Within each circuit pack 202 or 222, however, the local transmit clock 206 or 226 is not necessarily synchronized with the recovery clock (not shown) inside the CDR unit 208 or 228. Therefore, a simple signal loopback, e.g., sending the same packet received at node B back to node A, may not be possible. Thus, in one embodiment, the signal loopback is implemented as follows.

To initiate the span length measurement sequence, the packet generator 204 transmits packets P1 to node B according to the local clock 206. The packets P1 are recovered by the CDR 228 at circuit pack 222, in which the recovered clock inside CDR 228 is synchronized with the transmit clock 206. When the first packet P1 is recovered by CDR 228 and detected by detector 230, a signal is sent from detector 230 to a transmitter 224, which starts transmitting a packet P1 to node A according to a local clock 226. The CDR 208 at node A is configured to have a local recovered clock (not shown) that is synchronized with clock 226. The packet P1 sent from node B, i.e., loopbacked from node B, is recovered by CDR 208 and detected by detector 210. In one embodiment, node B is configured such that transmitter 224 starts transmitting a P1 packet with a minimal delay from the time of receipt of P1 by the detector 230. In one case, the time delay is within about 20 ns, which is the minimum reaction time of a 50 MHz clock in the circuit pack 222.

The receipt of the first P1 packet at node A indicates that node B has successfully entered the loopback mode. Detector 210 then sends a signal to the transmitter 204 to begin sending at least one packet P2 according to local clock 206. In general, only one packet P2 is necessary for flight time measurements, although additional packets P2 may be sent. The first packet P2 is used for measuring the roundtrip time, i.e., from node A to node B and back to node A.

When the first packet P2 is recovered by CDR 228 and detected by detector 230 at node B, a signal is sent to the transmitter 224 to start transmitting a packet P2 according to the local clock 226. When the first packet P2 is recovered by CDR 208 and detected by detector 210 of circuit pack 202, the time is registered as the roundtrip flight time for packet P2. Since the time delay between the receipt of the first packet P2 by CDR and the transmission of another packet P2 by transmitter 224 is kept to a minimum, the measured roundtrip flight time will be very close, or essentially equal to, the roundtrip time if the original packet P2 were directly loopbacked (instead of having a copy of P2 being transmitted from transmitter 224).

In one embodiment, the flight time can be measured by counting the number of bits between the start and stop time, e.g., by using the FPGA in circuit pack 202. The flight time between the transmission of the first packet P2 from node A and the receipt (at node A) of the first packet P2 from node B is obtained by multiplying the number of bits by the time duration for each bit. The span length is then determined based on the round trip flight time.

Figure 2B:
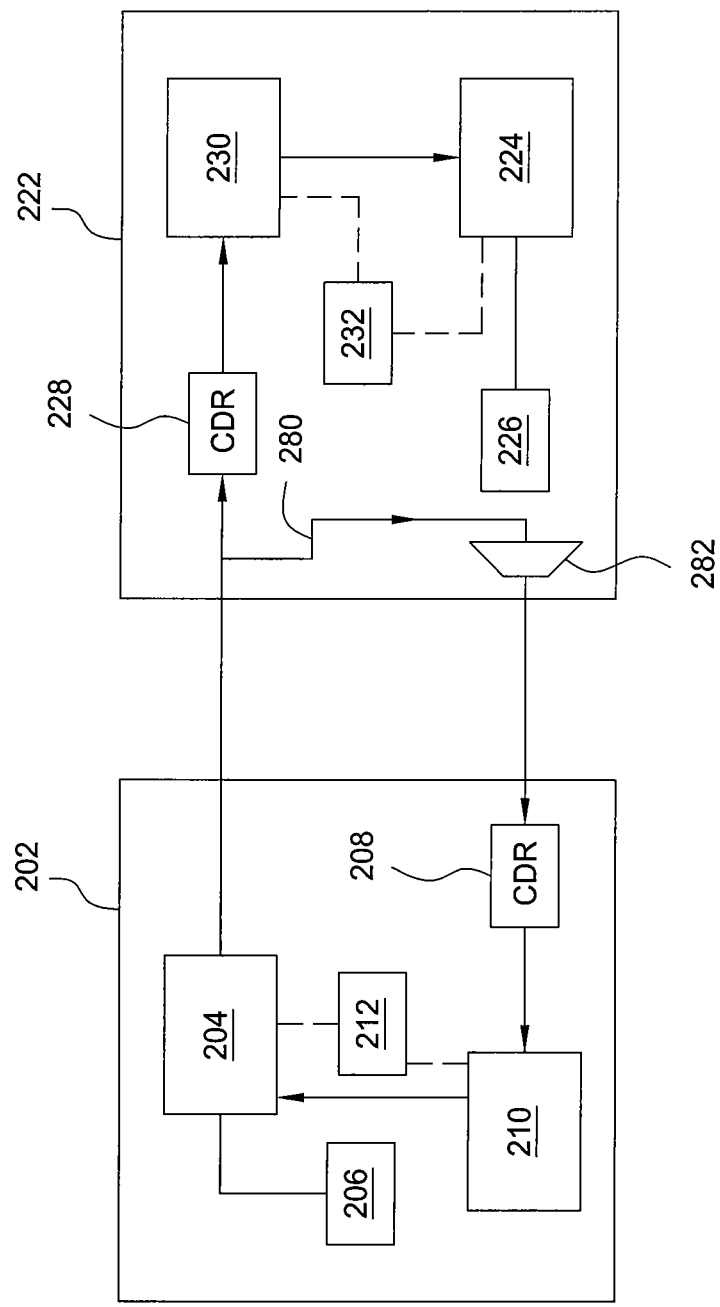

As previously mentioned, the apparatus in FIG. 2A can be used for flight time measurements if a simple (or direct) signal loopback is not feasible, e.g., due to a lack of synchronization between the local transmit clock and data recovery clock in a circuit pack. However, if a simple signal loopback is feasible, a different configuration such as that shown in FIG. 2B, can be used. In this case, a signal, e.g., packet P2, arriving at node B (which is already in loopback mode, either in response to a previously sent packet P1 or by instructions from a Craft Interface Terminal, or CIT) can be routed along a bypass connection 280 to a multiplexer 282 for communicating back to the circuit pack 202 of node A.

A computer for managing the optical communication system is used for communicating requests for the determination of various fiber characteristics, and for providing results to the users. In one embodiment, the computer is a CIT, which may be a computer with graphic user interface for managing the system over the management network LAN, or a computer connected directly to the target node via serial debug or RS232.

Figure 3:
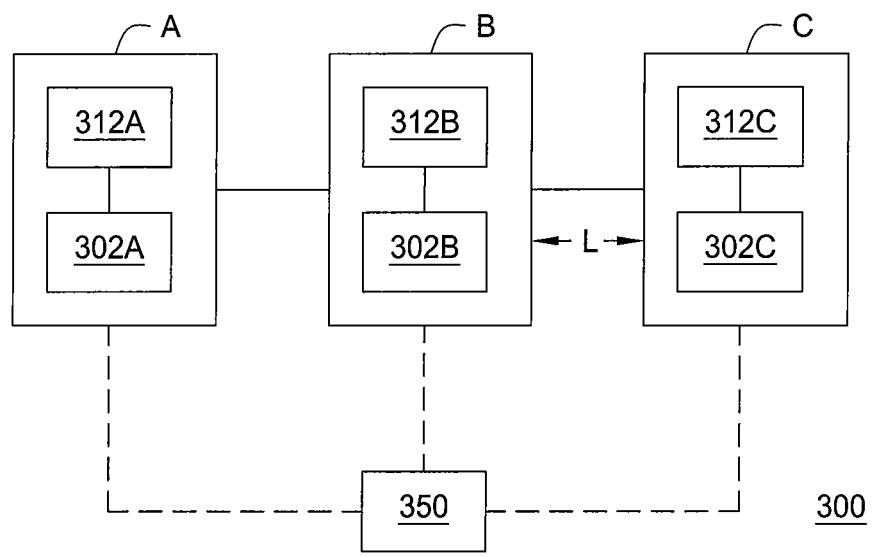
FIG. 3 is a schematic illustration of a portion of an optical communication system that can be configured for practicing embodiments of the present invention.

FIG. 3 is a schematic illustration of a CIT 350 connected to respective nodes A, B and C of a WDM system 300. Two-way communication paths are provided between the CIT 350 and respective controllers 302A, 302B and 302C of the nodes. These controllers may be referred to as an integrated system controller (ISC) or a system level controller (SLC). Each controller of nodes A, B and C is also connected to its associated circuit packs 312A, 312B and 312C, and each circuit pack includes components such as those previously described for circuit pack 202 or 222 of FIG. 2.

If a determination of fiber characteristics, e.g., fiber loss between nodes B and C, is needed, the CIT 350 will select one of the two controllers 302B and 302C to initiate the flight time measurement for span length calculation. For example, CIT 350 may send a signal or instruction to the controller 302B, which in turn, sends a signal to circuit pack 312B.

Circuit pack 312B then begins the measuring sequence by sending at least one loopback instruction packet P1, via the OSC, to circuit pack 312C, which will respond by entering the loopback mode and sending at least one packet P1 on the OSC back to circuit pack 312B. When packet P1 from circuit pack 312C is received by circuit pack 312B, at least one packet P2 will then be sent by circuit pack 312B to circuit pack 312C for measuring the roundtrip flight time of packet P2.

From the roundtrip flight time (T), the span length (L) between nodes B and C can be obtained. For example, assuming the same type of fibers and span length for the downstream and upstream links between nodes B and C, the span length is given by $L=(T/2)c$, where c is the speed of light in the fibers between the nodes, and is given by $c=c_o/\eta$ where $c_o$ is the speed of light in vacuum, and $\eta$ is the refractive index of the fiber.

From the span length, additional fiber characteristics such as fiber loss and chromatic dispersion can also be calculated. For example, the fiber loss between nodes B and C can be calculated by multiplying the span length by an insertion loss (expressed in decibel per unit length, e.g., dB/km) that is characteristic of the type of fiber used between the two nodes. As will be explained below, this calculated fiber loss can be compared with actual measured loss between nodes B and C as a performance monitor or for diagnostic purposes. Similarly, residual chromatic dispersion between the two nodes can also be calculated by multiplying the span length by a dispersion per unit length, e.g., ps/(nm-km).

Although the method of flight time measurement has been discussed in the context of two adjacent nodes, it can also be extended to non-adjacent nodes such as A and C, e.g., for directly measuring the flight time between nodes A and C (without separate measurements for nodes A and B, and nodes B and C). For example, the system may be configured so that node C is put into a loopback mode, and packets P1 and P2 are sent from node A to node B then node C. The P1 and P2 packets received at node C are then sent back to node A via node B. This may be accomplished by providing two circuit packs in node B—one for communicating with node A and another for communicating with node C. These two circuit packs in node B would need to pass the P1/P2 messages with each other within a sufficiently short time period so as not to affect the flight time measurement between nodes A and C.

Figure 4:
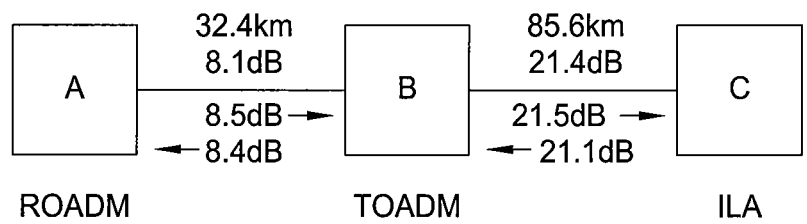
FIG. 4 is a schematic illustration of a network map display according to an embodiment of the present invention.

FIG. 4 is a schematic illustration of a WDM network map 400 that may be displayed by the CIT. In this example, nodes A, B and C are provided in a linear configuration. In general, nodes A, B and C may correspond to different types of nodes, e.g., ILA (in-line amplifier), TOADM (tunable optical add/drop multiplexer), ROADM (reconfigurable add drop multiplexer), and so on. Aside from showing the types of nodes, the network map 400 can also provide additional information relating to any span, when requested by a user. This additional information may include the span length, span loss and dispersion.

When service is initiated for a new system, the actual fiber span loss tends to be worse than that indicated during the planning phase due to various factors that may have developed during the time delay between planning and installation. In previous WDM systems, there is no convenient or non-intrusive method available to the user to verify the actual span loss.

According to one embodiment of the present invention, the system is configured to accept a user's request for verification of fiber characteristics. Specifically, the CIT can be configured such that, when a network map is displayed by the CIT, a user is presented with an option to request additional information to be displayed for any given span. When this option is selected, the CIT will prompt the user to enter the terminal identifiers (TID) of the adjacent nodes or network elements (NE) for which more detailed information is desired, and the user identification or password for logging into the NEs, as needed.

When the CIT receives a request or instruction to initiate the fiber characteristic calculation, it logs into one of the nodes and request the node to perform the calculation. The two nodes will begin their handshaking to derive the time of flight between the two nodes, i.e., the roundtrip time it takes for a packet to go between the two nodes, using the procedure previously described in connection with FIG. 1 and FIG. 2. Based on the measured flight time, the CIT can derive a calculated span length, from which span loss and residual dispersion (both of which depend on the fiber type) can be determined.

The calculated span loss can also be compared with the actual measured span loss to see if the values are within acceptable limits. These calculated and measured characteristics can then be tabulated and displayed by the CIT for review by the user.

Figure 5:
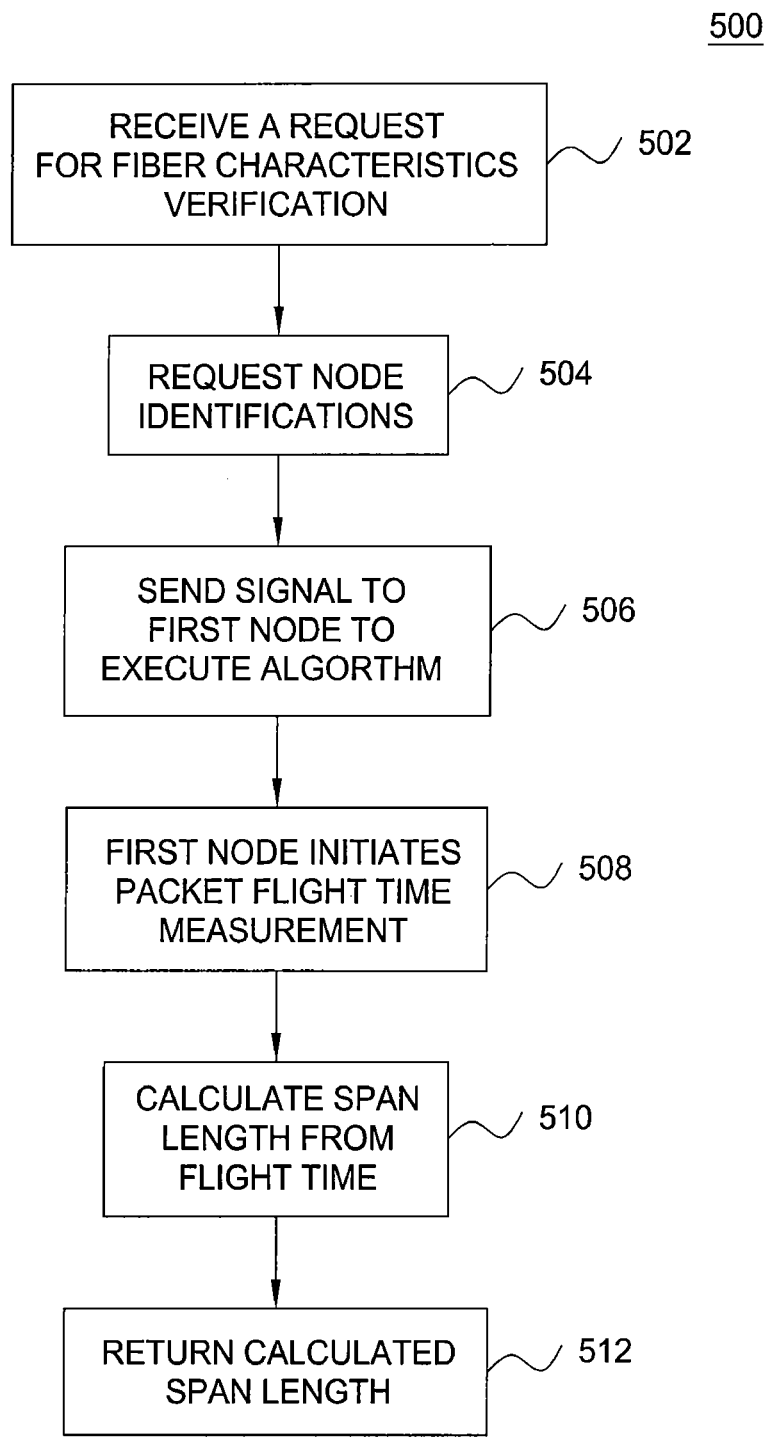
FIG. 5 is a flow chart showing a method incorporating one embodiment of the present invention.

FIG. 5 is a flow chart summarizing such a method 500. The method begins at block 502, in which a request is received by a component of the system, e.g., the CIT, for fiber characteristics verification. In block 504, the CIT requests identification of the endpoint nodes for which the verification information is desired. In block 506, after the requested information is received, the CIT sends a signal to a first node to execute an algorithm for the fiber characteristics verification.

In block 508, the first node, through its controller, executes the algorithm to initiate a measurement sequence of a roundtrip flight time between the first and second nodes. An example of a sequence for flight time measurement has been described in connection with FIG. 1 and FIG. 2. In block 510, the measured flight time is used to calculate a span length. The calculation is performed in firmware within the first node. In block 512, the calculated span length is returned to the CIT. Based on the calculated span length, other characteristics such as span loss and dispersion can also be derived, as explained below, and the results may be displayed in the network map.

Since different fiber types give rise to different loss (for the same span length), the CIT may display the calculated loss corresponding to different fiber types, e.g., standard single mode fiber (SSMF), large effective area fiber (LEAF), True Wave reduced slope fiber (TWRS), among others. Alternatively, the CIT may also be configured to accept inputs of different fiber types, for example, by allowing the user to specify a fiber type design (insertion loss, dispersion profile, and so on) for use in calculating the fiber characteristics.

The calculated fiber characteristics may also be compared with OTDR measurements that are done prior to system installation. Alternatively, the calculated values may be compared with the actual measured power loss for the downstream and upstream traffic between the two nodes. For example, the CIT can be configured such that, once the network map is computed, the transmitted optical power (OPT) and the received optical power (OPR) between each span are retrieved, as shown in Table 1. These measured powers can be obtained by the CIT logging into each node and retrieving the respective measured powers that are monitored in each OSC interface (e.g., at 1510 nm). In each case, the span loss is given by the difference between the transmitted power at the originating node and the power received at the destination node.

TABLE 1

Measured Span Loss from Node-to-Node OSC

| From TID | To TID | OPT (dBm) | OPR (dBm) | Span Loss (dB) |
|---|---|---|---|---|
| Node A | Node B | −1.0 | −9.5 | 8.5 |
| Node B | Node A | −1.0 | −9.4 | 8.4 |
| Node B | Node C | −0.5 | −22.0 | 21.5 |
| Node C | Node B | −0.8 | −21.9 | 21.1 |

If the measured loss is approximately equal to the calculated loss, then one can be confident of reasonable performance from the fiber links. On the other hand, a large discrepancy between the measured and calculated loss, e.g., outside a predetermined limit, will suggest that further investigations are needed prior to turning up services. Discrepancy in the measured versus calculated loss may arise from a variety of factors, including for example, extra fiber splices that are unaccounted for, dirty connectors, and so on. The availability of this diagnostic capability should greatly facilitate system installation.

Once the CIT has computed the span distance and the fiber type has been selected by the user, the network map may be displayed in a "detail" mode, as shown in FIG. 4.

In this example, the calculated span length (in km) and the calculated span loss for SSMF fiber type (assuming 0.25 dB/km for the 1550 nm wavelength) are shown above the fiber link. The normalized measured span loss (in dB) in each direction are shown below the fiber link. Since the span loss in the downstream and the upstream directions are generally not the same, they are shown with respective arrows indicating the particular traffic direction.

Based on the calculated fiber span length between two nodes, the CIT can also calculate approximate residual chromatic dispersion for different fiber types by multiplying the span length by the corresponding dispersion for each fiber type.

In one embodiment, the CIT may also display the calculated span distance, the calculated fiber loss, the measured fiber loss, and the residual dispersion for each fiber type in tabulated form.

By allowing real-time determination of fiber characteristics without the need to disconnect the fibers from the WDM system, embodiments of the present invention provide enhanced diagnostic capabilities that can greatly facilitate system installation or maintenance.

While the foregoing is directed to embodiments of the present invention, other and further embodiments of the invention may be devised without departing from the basic scope thereof, and the scope thereof is determined by the claims that follow.

The invention claimed is:

1. A method of deriving a characteristic of a span of optical fiber between a first node and a second node in a wavelength division multiplexing (WDM) optical communication system, comprising:

at the first node, transmitting at least one loopback instruction toward the second node via an optical supervisory channel (OSC) over the optical fiber, the loopback instruction adapted to cause the second node to enter a loopback mode of operation, the loopback instruction comprising a packet having a first predetermined bit pattern;

at the first node, transmitting according to a first clock, at least one first measurement signal toward the second node via the optical supervisory channel, the measurement signal comprising a packet having a second predetermined bit pattern;

at the first node, recovering according to a second clock, via the optical supervisory channel at least one second measurement signal, each second measurement signal comprising a loopback signal associated with a corresponding one of the at least one first measurement signal;

determining a roundtrip time associated with the transmitting of the at least one first measurement signal and the recovering of the at least one corresponding second measurement signal; and calculating at least one fiber characteristic based on the roundtrip time.

2. The method of claim 1, wherein each loopback instruction and each measurement signal comprises a data packet adapted to be transmitted contemporaneously with transmission of data traffic via the optical fiber.

3. The method of claim 1, wherein the second measurement signal is a copy of the first measurement signal.

4. The method of claim 3, wherein
the at least one first measurement signal and the at least one loopback instruction have different predetermined bit patterns.

5. The method of claim 1, wherein the at least one loopback instruction and the at least one first measurement signal are synchronized to a local clock at the first node, and the at least one second measurement signal is synchronized to a local clock at the second node.

6. The method of claim 1, wherein the at least one fiber characteristic comprises at least one of span length, span loss and fiber dispersion.

7. The method of claim 1, further comprising displaying the calculated at least one fiber characteristic on a network map using a craft interface terminal (CIT).

8. The method of claim 1, wherein the calculated at least one fiber characteristic includes a calculated span loss, and further comprising measuring a span loss for each direction between the first node and the second node, and comparing the measured span loss with the calculated span loss.

9. A system comprising:
a first node configured to transmit a first measurement signal toward a second node via an optical supervisory channel via a span of optical fiber, the first measurement signal comprising a packet having a predetermined bit pattern;
a second node configured to operate in a loopback mode of operation in which the second node transmits a second measurement signal toward the first node in response to recovering from the supervisory channel a packet having the predetermined bit pattern;
the first node further configured to determine a roundtrip time associated with the transmitted first measurement signal and a corresponding second measurement signal received via the supervisory channel, and determining at least one fiber characteristic based on the measured roundtrip time;
the first node comprises a transmitter configured to transmit packets according to a first clock rate, and a data recovery unit configured to recover received packets according to a second clock rate; and
the second node comprises a data recovery unit configured to recover packets according to the first clock rate, and a transmitter configured to transmit packets according to the second clock rate.

10. The system of claim 9, wherein the first and second nodes are configured such that a roundtrip time, for the first measurement signal to travel between the first node and the second node and the corresponding second measurement signal to travel between the second node and the first node is about equal to a time between transmission of the first measurement signal from the first node and receiving the corresponding second measurement signal at the first node.

11. The system of claim 9, wherein the at least one fiber characteristic includes at least one of span length, span loss, and fiber dispersion between the first node and the second node.

12. The system of claim 11, wherein the first node further comprises a field programmable gate array containing instructions adapted to cause the first node to transmit the first measurement signal to the second node, to measure the roundtrip time for the first measurement signal to travel between the first node and the second node and the corresponding second measurement signal to travel between the second node and the first node, and to calculate the at least one fiber characteristic.

13. The system of claim 9, further comprising a craft interface terminal (CIT) connected to the first node and the second node, the CIT configured to send an instruction to the first node to initiate transmission of the first measurement signal toward the second node.

14. The system of claim 13, wherein the CIT is further configured to send an instruction to the second node to transmit the second measurement signal to the first node in response to receiving the first measurement signal from the first node.

15. The system of claim 14, wherein the CIT is further configured to display a network map showing information of the at least one fiber characteristic of the span between the first node and the second node.

16. A tangible and non-transitory computer readable storage medium containing instructions, which when executed, cause an apparatus to perform a method of deriving a characteristic of a span of optical fiber between a first node and a second node in a wavelength division multiplexing (WDM) optical communication system, the method comprising:
at a first node, transmitting according to a first clock, at least one loopback instruction toward a second node via an optical supervisory channel (OSC) over an optical fiber span, the loopback instruction adapted to cause the second node to enter a loopback mode of operation, the loopback instruction comprising a packet having a first predetermined bit pattern;
at the first node, transmitting at least one first measurement signal toward the second node via the optical supervisory channel, the at least one first measurement signal comprising a packet having a second predetermined bit pattern;
at the first node, recovering according to a second clock, via the optical supervisory channel at least one second measurement signal, each second measurement signal comprising a loopback signal associated with a corresponding one of the at least one first measurement signal;
determining a roundtrip time associated with the transmitting of the at least one first measurement signal and the recovering of the at least one corresponding second measurement signal; and
calculating at least one fiber characteristic based on the roundtrip time.

17. The tangible and non-transitory computer readable storage medium of claim 16, wherein the at least one fiber characteristic includes at least one of span length, span loss and fiber dispersion between the first node and the second node.

18. The method of claim 1, wherein said first and second clocks are asynchronous.

19. The method of claim 1, wherein said first node and second node comprise adjacent nodes in said WDM optical communication system, said calculated fiber characteristic associated with an optical fiber path between said first and second nodes.

20. The method of claim 1, wherein said first node and second node comprise non-adjacent nodes in said WDM optical communication system, said calculated fiber characteristic associated with an optical fiber path between said first and second nodes and at least one node there between.

* * * * *